(12) United States Patent
Okajima et al.

(10) Patent No.: US 6,354,668 B2
(45) Date of Patent: *Mar. 12, 2002

(54) BICYCLE RIM WITH WEAR INDICATOR

(75) Inventors: Shinpei Okajima, Izumi; Tsutomu Muraoka, Sakai, both of (JP)

(73) Assignee: Shimano, Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/878,391

(22) Filed: Jun. 12, 2001

Related U.S. Application Data

(63) Continuation of application No. 09/526,314, filed on Mar. 16, 2000, now Pat. No. 6,283,557.

(51) Int. Cl.$^7$ ................................................ B60B 21/00
(52) U.S. Cl. .......................................... 301/97; 301/58
(58) Field of Search ............................. 301/95, 96, 97, 301/98, 6.9, 54, 55, 58, 59; 188/1.11 R, 24.13

(56) References Cited

U.S. PATENT DOCUMENTS

| | | |
|---|---|---|
| 720,048 A | 2/1903 | Miller |
| 734,731 A | 7/1903 | Miller |
| 818,175 A | 4/1906 | Howe et al. |
| 1,384,128 A | 7/1921 | Gase |
| 1,483,398 A | 2/1924 | Whitehead |
| 1,492,850 A | 5/1924 | Hubbard |
| 3,433,327 A | 3/1969 | Regis |
| 3,553,642 A | 1/1971 | Rike et al. |
| 3,732,951 A | 5/1973 | Hata et al. |
| 3,918,553 A | 11/1975 | Hattwig et al. |
| 4,561,481 A | 12/1985 | Kawauchi et al. |
| 4,982,767 A | 1/1991 | Pezzoli et al. |
| 5,445,439 A | 8/1995 | Dietrich |
| 5,452,945 A | 9/1995 | Schlanger |
| 5,540,485 A | 7/1996 | Enders |
| 5,707,114 A | 1/1998 | Schlanger |
| 5,882,088 A | 3/1999 | Yahata |
| 5,939,978 A | 8/1999 | Kyrtsos |
| 6,068,347 A | 5/2000 | Okajima et al. |
| 6,068,348 A | 5/2000 | Okajima et al. |
| 6,216,758 B1 * | 4/2001 | Chen .......................... 301/95 |
| 6,257,676 B1 * | 7/2001 | Lacombe et al. ............. 301/97 |
| 6,283,557 B1 * | 9/2001 | Okajima et al. ............. 301/97 |

FOREIGN PATENT DOCUMENTS

| | | |
|---|---|---|
| DE | 295 20 629 U1 | 4/1996 |
| DE | 197 29 824 A1 | 1/1998 |
| DE | 297 17 180 U1 | 1/1998 |
| WO | WO 97/2614 A1 | 7/1997 |
| WO | WO 99/00259 A1 | 1/1999 |

\* cited by examiner

*Primary Examiner*—S. Joseph Morano
*Assistant Examiner*—Long Bao Nguyen
(74) *Attorney, Agent, or Firm*—Shinjyu Global IP Counselors, LLP

(57) ABSTRACT

A bicycle rim is provided with a wear indicator. The bicycle rim has an outer annular portion, an annular spoke attachment portion and a pair of oppositely facing annular braking surfaces. The outer annular portion is adapted to receive a tire and the annular spoke attachment portion is coupled to the outer annular portion. The annular spoke attachment portion is adapted to be coupled to a plurality of spokes. At least one of the annular braking surfaces has a wear indicator.

29 Claims, 9 Drawing Sheets

BICYCLE RIM WITH WEAR INDICATOR

CROSS REFERENCE TO RELATED APPLICATION

This application is a Continuation of application Ser. No, 09/526,314, filed on Mar. 16, 2000, now U.S. Pat. No. 6,283,557.

BACKGROUND OF THE INVENTION

1. Field of the Invention

This invention generally relates to a bicycle rim with a wear indicator. More specifically, the present invention relates to bicycle rim with a wear indicator formed as a recess in a braking section of the rim.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles, which has been extensively redesigned over the past years, is the bicycle wheel. Bicycle wheels are constantly being redesigned to be lightweight and more aerodynamic in design as well as to be simple to manufacture and assemble.

There are many different types of bicycle wheels, which are currently available on the market. The most basic bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are provided with a flange that is used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to the rim. In particular, the spoke nipples have flanges, which engage the interior surface of the rim. Alternatively, the spokes may be reversed, with the outer end having the nail head and the inner end having the threads for engaging spoke nipples, which secure the inner ends of the wire spokes to the hub.

With a spoke constructed in this manner, the nipples are installed in nipple holes formed in either the rim or the hub. The spokes are inserted through holes in either the hub flange or the rim with the flanges of the spokes engaging the areas surrounding the holes in either the hub flange or the rim. The male threads on the ends of the spokes are threaded into the female threads of the spoke nipples installed in the openings of the hub flange or the rim. It is desirable in the bicycle industry to have as few spokes as possible. One problem with conventional spokes is the concentrated stress applied to the rim. If fewer spokes are used, the stress on the rim becomes increasingly larger. Moreover, after extended use, the rim braking surfaces can wear due to continued contact with brake pads. This wear of the braking surfaces can weaken the strength of the rim and, consequently, the rim may fail. This weakening of the rim can increase risk of personal injuries to the rider.

In view of the above, there exists a need for a bicycle rim with a wear indicator which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle rim with a wear indicator that indicates wear of each side of the bicycle rim.

Another object of the present invention is to provide a bicycle rim with a wear indicator that prevents excess weakening or failure of the rim.

Another object of the present invention is to provide a bicycle rim with a wear indicator that prevents personal injuries to the rider.

Yet another object of the present invention is to provide a bicycle rim with a wear indicator that is relatively simple and inexpensive to manufacture.

The foregoing objects can basically be obtained by providing a bicycle rim with a wear indicator. The bicycle rim has an outer annular portion, an annular spoke attachment portion and a pair of oppositely facing annular braking surfaces. The outer annular portion is adapted to receive a tire and the annular spoke attachment portion is coupled to the outer annular portion. The annular spoke attachment portion is adapted to be coupled to a plurality of spokes. At least one of the annular braking surfaces has a wear indicator.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
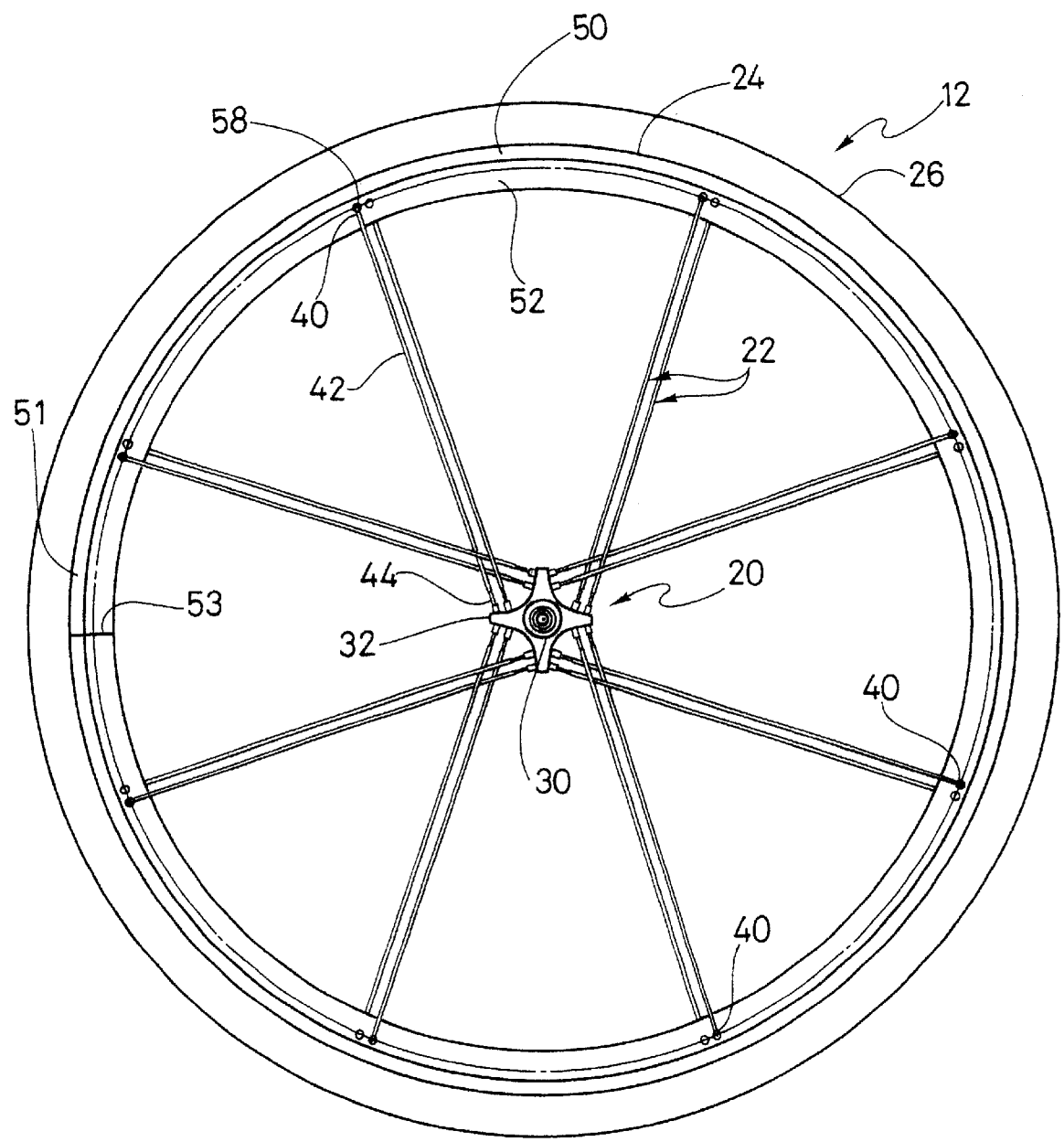
FIG. 1 is a side elevational view of a front bicycle wheel with a front hub, sixteen spokes and a rim with a wear indicator in accordance with the present invention.
Figure 2:
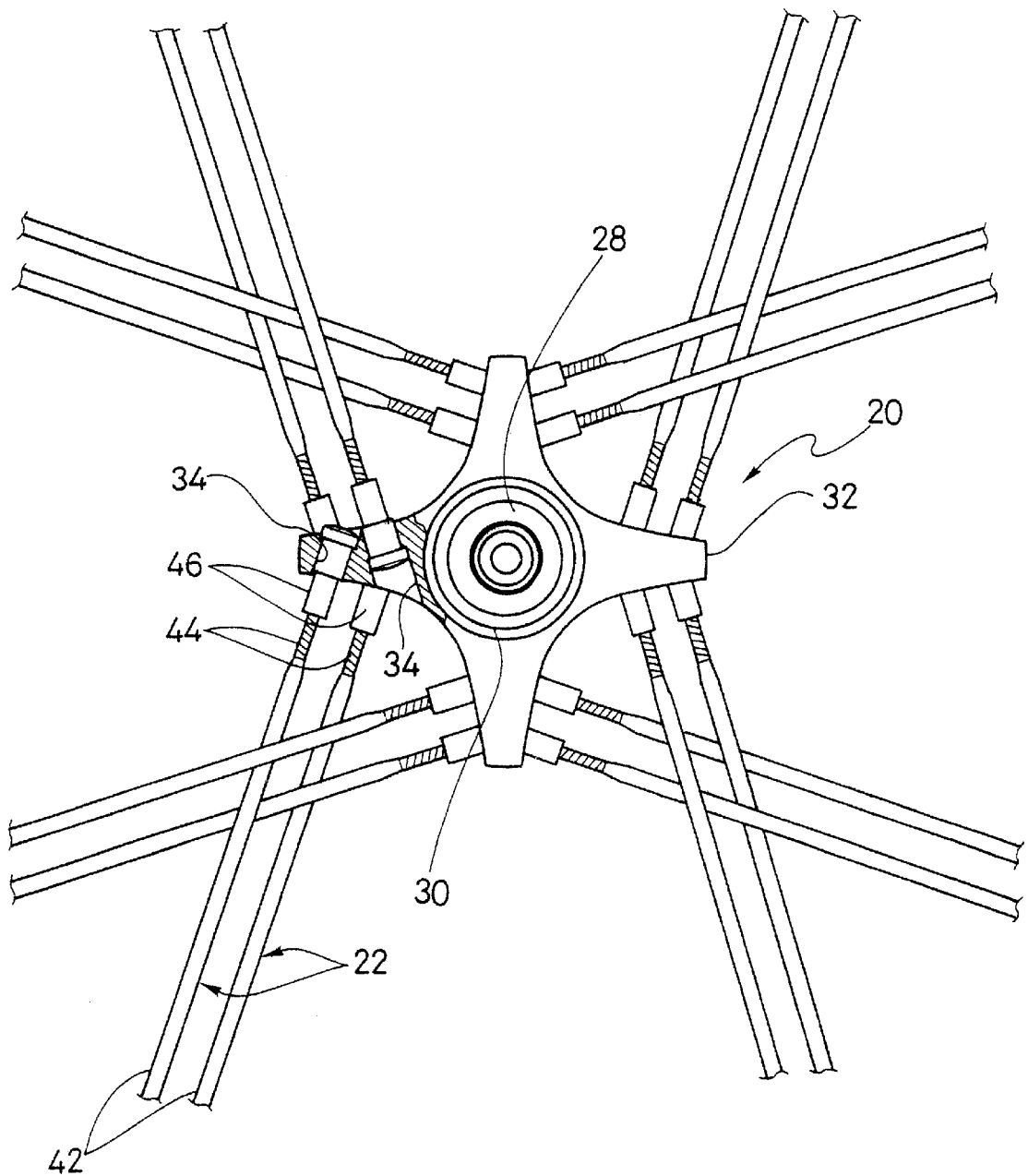
FIG. 2 is a partial, enlarged elevational view of the front bicycle hub illustrated in FIG. 1 with the inner end portions of the spokes coupled thereto.
Figure 3:
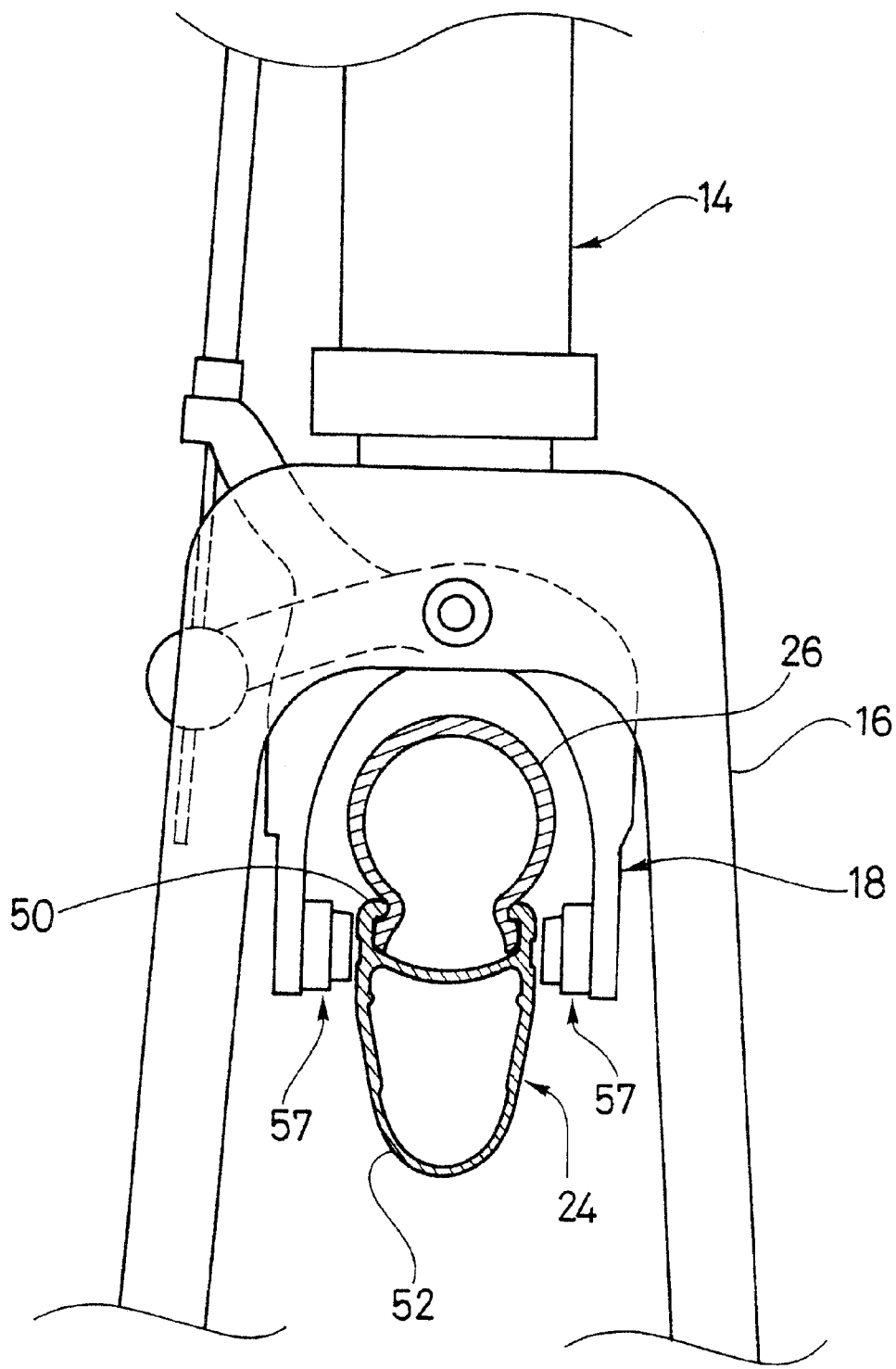
FIG. 3 is an enlarged, end elevational of a bicycle braking device with a portion of the wheel illustrated in FIG. 1 shown in cross-section.
Figure 4:
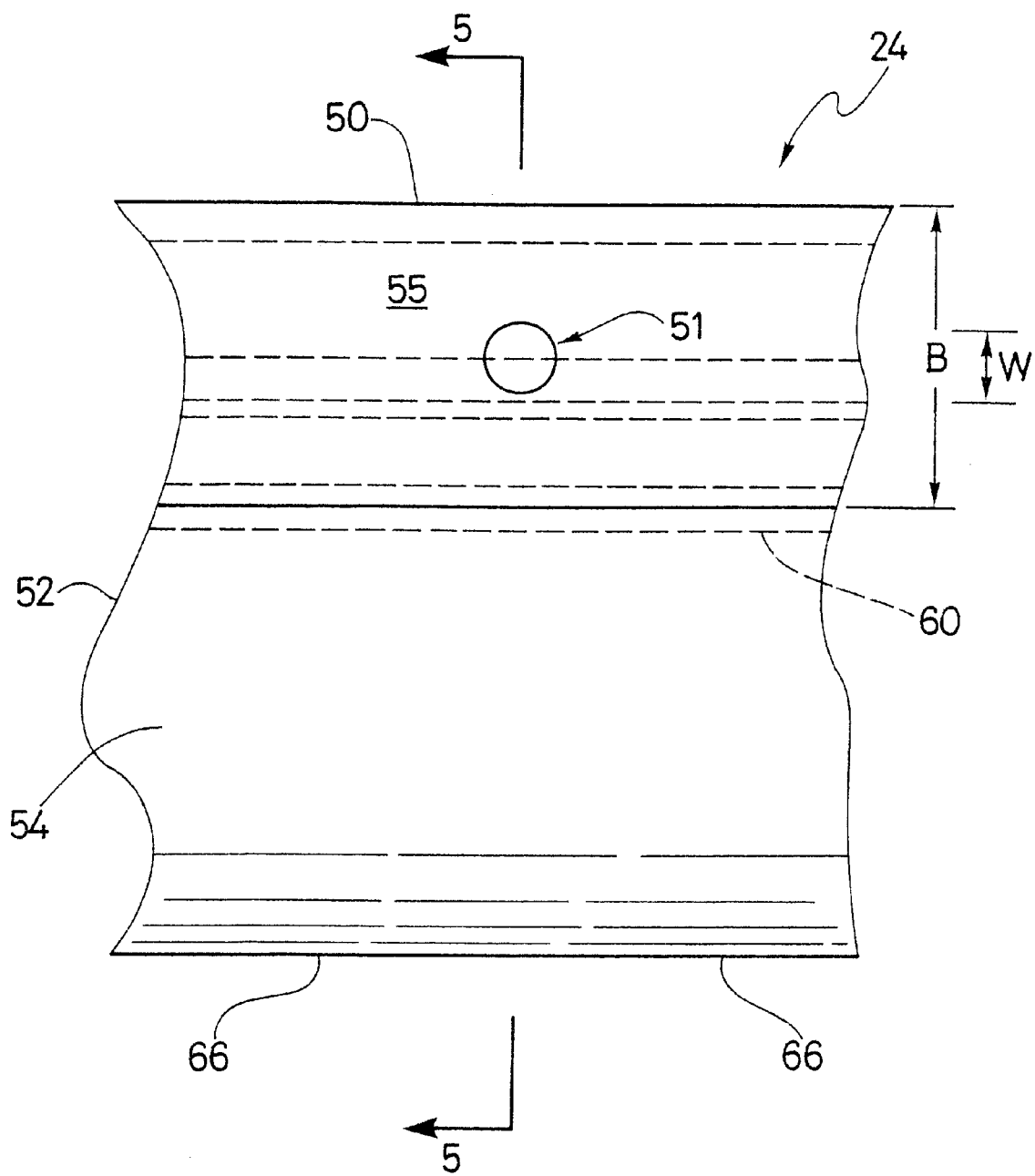
FIG. 4 is an enlarged, partial side elevational view of a portion of the front bicycle wheel illustrating the wear indicator of the rim illustrated in FIG. 1.

Referring initially to FIGS. 1–3, a bicycle wheel 12 is illustrated in accordance with the present invention. Bicycle wheel 12 can be utilized as either a front bicycle wheel or a rear bicycle wheel and is mounted between a pair of forks 16 of a frame 14 of a bicycle as seen in FIG. 3. Accordingly, it will be apparent to those skilled in the art from this disclosure that the description pertaining to the construction of bicycle wheel 12 applies to either a front bicycle wheel or a rear bicycle wheel.

Bicycle wheel 12 has a central hub or central mounting portion 20, a plurality of outwardly extending spokes 22 and an annular rim portion 24 with a pneumatic tire 26 coupled thereto in a conventional manner. Annular rim portion 24 has a pair of wear indicators (recesses 51) formed in rim 24. In the illustrated embodiment shown herein, bicycle wheel 12 has sixteen spokes 22 extending radially between central hub 20 and annular rim portion 24. Of course, it will be apparent to those skilled in the art from this disclosure that the bicycle wheel 12 can have fewer or more spokes 22 than illustrated if needed and/or desired.

Hub 20 has a tubular body section 30 with a pair of end flanges 32 for mounting spokes 22 thereto. Each end flange 32 has four spoke attachment points with holes 34 for coupling a pair of spokes 22 thereto. Tubular body section 30 has an axial bore that is adapted to receive a hub assembly 28 therein.

The number and shape of the spoke attachment points of end flanges 32 will depend upon the number of spokes and their shapes. Accordingly, it will be apparent to those skilled in the art from this disclosure that other types and shapes of hubs can be utilized in connection with the present invention.

Each of the spokes 22 has an outer end portion 40, a center or middle portion 42 and an inner end portion 44. Outer end portions or spoke heads 40 are coupled to rim 24 by reinforcement members or washers 48 as discussed below. Reinforcement members or washers 48 are designed to disperse the stresses applied to rim 24 by spokes 22.

Referring to FIGS. 4–11, rim 24 is substantially circular as seen in side elevation (FIG. 1), and has an outer annular portion 50 and an annular spoke attachment portion 52. Rim 24 has a pair of oppositely facing, annular external braking surfaces 55 for engaging a pair of brake pads 57. Brake pads 57 are pushed against braking surfaces 55 by a brake actuating device 18. Rim 24 has a pair of recesses 51 for indicating wear of rim 24. Specifically, recesses 51 are disposed in opposite sides of rim 24. More specifically, recesses 51 are formed in the pair of oppositely facing braking surfaces 55 of rim 24.

Braking surfaces 55 are annular, flat external surfaces of rim 24. Braking surfaces 55 are preferably parallel to each other and face in opposite directions. Braking surfaces 55 each have a radial width B greater than a radial width of a brake pad 57. Preferably, each braking surface 55 has a radial width of about 10.5 millimeters. The pair of oppositely facing brake pads 57 are forced against braking surfaces 55 during a braking operation to apply a stopping force to rim 24. Preferably, brake pads 57 contact braking surfaces 55 at radially centered locations on braking surfaces 55. Also, each brake pad 57 preferably contacts its respective braking surface 55 at the same radial location as the other oppositely facing brake pad 57. After extended use, braking surfaces 55 can become worn due the repeated frictional forces applied by brake pads 57. Recesses 51 are provided to indicate when the wear of either braking section 55 has reached an unacceptable level.

Brake pads 57 and brake pad actuating device 18 used to stop bicycle wheel 12 are well known in the prior art. Therefore, brake pads 57 and brake pad actuating device 18 will not be discussed or illustrated in detail herein. In the illustrated embodiment, brake pads 57 and brake actuating device 14 are "road" type components, and are coupled to forks 16 of frame 14. Of course it will be apparent to those skilled in the art from this disclosure that the present invention could be used with any suitable bicycle utilizing other suitable braking devices. For example, the present invention could be utilized in rims designed for "mountain" or "off-road" type bicycles.

Figure 6:
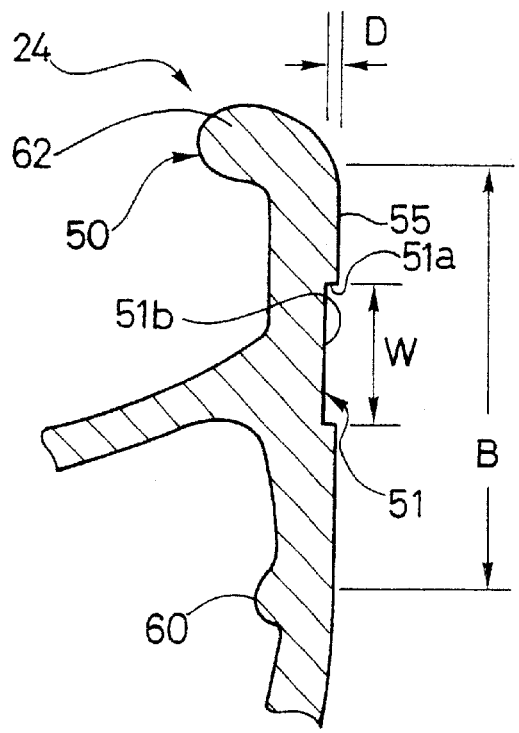
FIG. 6 is an enlarged, partial cross-sectional view of a portion of the bicycle rim illustrated in FIG. 5.

Each recess 51 is formed of a cylindrical side wall 51a and a flat end wall 51b as best seen in FIG. 6. Preferably, cylindrical side walls 51a have circular shaped cross-sections and are substantially perpendicular to their respective braking surfaces 55. End walls 51b are offset from braking surfaces 55 and are preferably substantially parallel to braking surfaces 55. Each recess is preferably circumferentially spaced from access apertures 56 and spoke openings 58. Therefore, the presence of recesses 51 does not significantly weaken rim 24. Each recess 51 is formed at a radially centered location in the respective braking surfaces 55. Therefore, recesses 51 are formed at a corresponding radial location on braking surfaces 55 as the contact location between brake pads 57 and braking surfaces 55.

Recesses 51 each have a radial width W and a depth D. Radial widths W are smaller than the radial width of brake pads 57. Therefore, recesses 51 each have a radial width W that is also smaller than the radial width B of their respective braking surfaces 55. Since recesses 51 have circular cross-sections, radial width W corresponds to the diameter of recesses 51. Brake pads 57 typically have a radial width of approximately 7.0 millimeters. The radial width W of each recess 51 is about 1.0 to 5.0 millimeters. More specifically, each recess 51 preferably has a radial width W of about 3.0 millimeters. Moreover, the radial width W of each recess 51 is preferably about one third of the radial width B of its respective braking surface 55. Accordingly, if brake pads 57 are not radially centered with respect to braking surfaces 55, brake pads 57 will still contact at least portions of recesses 51 and wear of braking surfaces 55 can be indicated.

Depth D of each recess 51 corresponds to a predetermined amount of wear of each respective braking surface 55. Specifically, each recess 51 has a depth D of about 0.10 to about 0.30 millimeter. More specifically, each recess 51 preferably has a depth D of about 0.20 millimeter. The predetermined amount of wear of braking surfaces 55 corresponds to an unacceptable amount of wear for rim 24. Unacceptable wear of rim 24 can cause rim 24 to fail and can cause personal injury to a rider. For example, in the illustrated embodiment, if one of braking surfaces 55 wears 0.20 millimeter or more, the strength of rim 24 is no longer acceptable for use.

As discussed above, recesses 51 are formed in oppositely facing braking surfaces 55. Therefore the wear of each braking surface 55 can be indicated. If either of the recesses 51 disappears, the rim has worn an unacceptable amount. For example, with some braking devices, one brake pad 57 is applied to its respective braking surface 55 with more force than the other brake pad 57. Accordingly, braking surfaces 55 of rim 24 may not wear at the same rate. Moreover, sometimes rim 24 can be slightly bent or deformed during use causing one braking surface 55 to wear more than the other. By providing a pair of wear indicating recess 51 in the pair of oppositely facing braking surfaces 55, wear of both braking surfaces 55 can be indicated.

Figure 7:
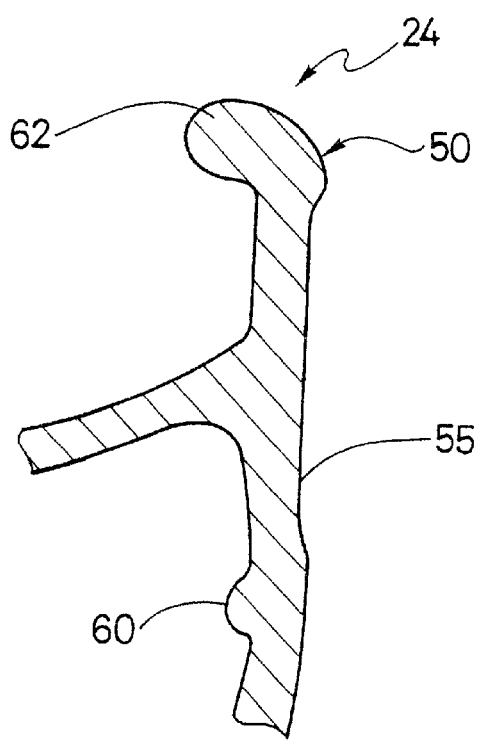
FIG. 7 is an enlarged, partial cross-sectional view of a portion of the bicycle rim illustrated in FIG. 5 showing a predetermined amount of wear.

Referring to FIGS. 6 and 7, two states of wear of one of the braking surfaces 55 are illustrated. Before braking surface 55 is worn, recess 51 has a depth D as discussed above and as best seen in FIG. 6. As braking surface 55 wears, depth D of recess 51 decreases. Eventually, after a predetermined amount of wear, recess 51 will disappear as seen in FIG. 7. Therefore, when recess 51 disappears, an unacceptable amount of wear of braking surface 55 is indicated. When an unacceptable amount of wear has occurred, the rim 24 needs to be replaced.

Recesses 51 used as wear indicators provide the advantage of providing both visual and mechanical indication of wear of braking surfaces 55. Specifically, when the rim 24 is not significantly worn, recesses 51 can be easily seen with the human eye or sidewalls 51a can be felt with the human hand. After significant wear of braking surfaces 55, it may become more difficult to see recesses 51. However, side walls 51a of recesses 51 can still be felt by the human hand.

Figure 11:
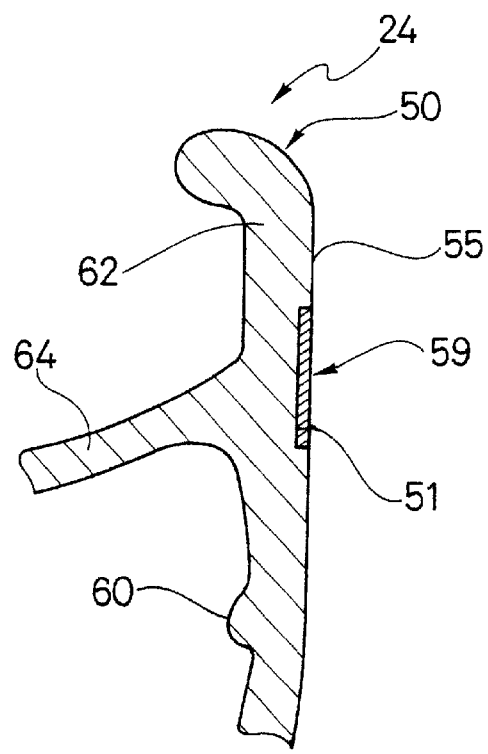
FIG. 11 is an enlarged, partial cross-sectional view of a portion of the bicycle rim illustrated in FIG. 5 showing other material arranged in the recess.

Referring to FIG. 11, optionally, recesses 51 can be filled with other material 59. Other material 59 can be any suitable material that will wear along with braking surfaces 55 such as plastic or soft metal. Preferably, material 59 has a different visual appearance than braking surfaces 55. Specifically, material 59 is preferably an opaque material with a color that contrasts with the color of braking surfaces 55. Other material 59 arranged in recesses 51 provides a better visual indicator of wear to the cyclist or mechanic. Of course, it will be apparent to those skilled in the art from this disclosure that other material 59 could be formed of several layers of different colored materials as needed and/or desired. For example, other material 59 could be formed of three multicolored layers, with each layer having a thickness corresponding to a different predetermined amount of wear of rim 24.

Recesses 51 are located at a predetermined circumferential location in braking surfaces 55 of rim 24. Preferably, recesses 51 are located at a circumferential location approximately six degrees from a seam or weld 53 of rim 24. With this arrangement, the cyclist or mechanic will know where to look or feel for recess 51 to check the wear of rim 24. Moreover, because recesses 51 are adjacent seam or weld 53, the strength of rim 24 is not significantly reduced by the presence of recess 51.

Recesses 51 are preferably formed in braking surfaces 55 by machining. Of course it will be apparent to those skilled in the art from this disclosure that recess 51 could be formed using any suitable manufacturing technique that provides close tolerances. For example, recesses 51 could be formed by drilling or molding braking surfaces 55 of rim 24.

It will also be apparent to those skilled in the art from this disclosure that recesses 51 could have different sizes, shapes and/or configurations as needed and/or desired. For example, the depth of recesses 51 could be increased if utilized in a wheel with more strength or decreased in a wheel with less strength. Moreover, it will be apparent to those skilled in the art that wear indicators or recesses 51 could be utilized with any suitable rim as needed and/or desired. In any case, if recesses 51 are utilized in other wheel designs, recesses 51 should be sized or configured to indicate an unacceptable amount of wear of braking surfaces of the rim of the wheel.

Figure 12:
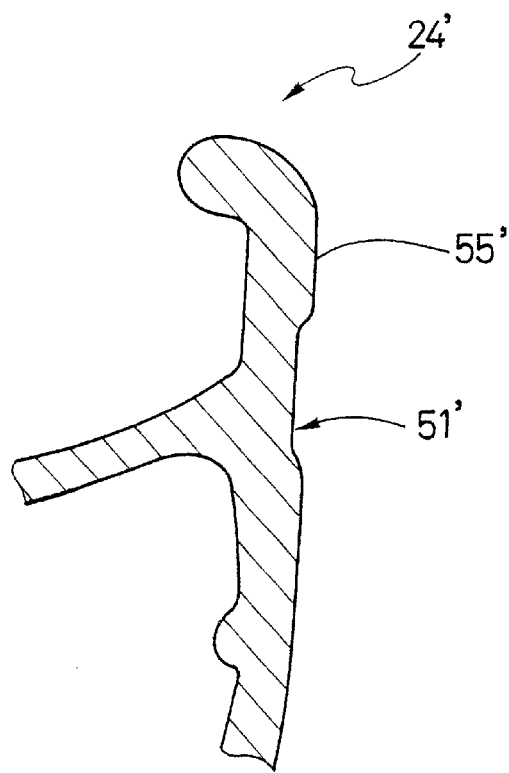
FIG. 12 is an enlarged, partial cross-sectional view of a portion of the bicycle rim illustrated in FIG. 5 showing a modified recess with curved corners.

Referring to FIG. 12, a portion of a modified rim 24' with a recess 51' is illustrated in accordance with the present invention. Rim 24' is identical to rim 24 except that recesses 51' (only one shown) have been modified. In particular, the intersection between side wall 51a and end wall 51b is curved instead of a sharp corner as in the first embodiment. Accordingly, rim 24' will not be discussed or illustrated in detail herein. Specifically, recesses 51' are formed by "punching" braking surfaces 55' of rim 24'. The use of this "punching" manufacturing technique results in the curved corners of recesses 51'. Of course, it will be apparent to those skilled in the art from this disclosure that recesses 51' with curved intersections could be formed using any suitable manufacturing technique. For example, recesses 51' with curved corners could be formed by machining.

The structure of bicycle wheel 12 and its parts will now be discussed in more detail. First, spokes 22 will be discussed. Straight center portion 42 of a spoke 22 is located radially inwardly of outer end portion 40, and inner end portion 44 located radially inwardly of the center portion 42. Center portion 42 is coupled to hub 20 in a relatively conventional manner. Preferably, outer end portion 40, center portion 42 and inner end portion 44 are constructed as a unitary, one-piece member with spoke nipples 46 theadedly coupled to the inner end portion 44 of each of the spokes 22 for connection to hub 20 as best seen in FIG. 2.

As best seen in FIGS. 1, 2, 8 and 9, outer end portions 40 of spokes 22 have a bent section 40a with an enlarged head 40b at the free end of bent section 40a. Heads 40b are offset from bent sections 40a. The head 40b has a larger width or diameter than bent section 40a to secure spoke 22 to rim 24 via reinforcement member or washer 48. Center portions 42 and inner end portions 44 each have a circular or elliptical cross section. Of course, it will be apparent to those skilled in the art that constant cross section spokes can be utilized or spokes with a varying cross section can be utilized as needed and/or desired. Moreover, spokes with other cross-sections could be utilized without departing from the scope of the present invention.

Of course, it will also be apparent to those skilled in the art from this disclosure that outer end portions 40 can be bent or formed to have a different shape and/or cross section than the illustrated shapes and cross sections. In any event, the shapes and cross sections of bent section 40a and head 40b of each spoke should be configured to prevent axial movement of the spoke relative to rim 24 when the spoke is in the installed position.

The structure of rim 24 will now be discussed in more detail. Referring to FIGS. 3–5 and 8–10, the rim 24 is a so-called deep rim in which the rim's radial height is greater than the rim's axial width. Rim 24 is designed to have a "clincher" type pneumatic tire 26 fastened thereto in a conventional manner. It will be apparent to those skilled in the art that the shape of rim 24 could be modified to accommodate different types of tires as needed and/or desired without departing from the scope of the present invention. For example, rim 24 could be modified to accommodate "tubular" or "sew-up" type tires which are adapted to be cemented to an outer surface of a rim.

Preferably, outer annular portion 50 of rim 24 has a substantially "U-shaped" cross-section adapted to receive a "clincher" type pneumatic tire 26. Outer annular portion 50 of rim 24 has a plurality of access apertures 56 for inserting spokes 22 therethrough and into a plurality of spoke openings 58 of annular spoke attachment portion 52. Annular spoke attachment portion 52 also has a substantially "U-shaped" cross-section and is fixedly coupled to outer annular portion 50.

Of course, it will be apparent to those skilled in the art from this disclosure that rim 24 could have other configurations as needed and/or desired without departing from the scope of the present invention. For example rim 24 could be conventional and have a substantially "U-shaped" cross-section. In such a rim, the pair of outer flanges form the outer annular portion for receiving a tire and the tubular inner portion forms the spoke attachment portion. Rim 24 could also be designed for use with "tubular", or "sew-up" type tires as discussed above. In such a rim, the outer annular portion is a curved tubular section and the spoke attachment portion is a substantially "U-shaped" section with spokes coupled thereto. In any case, rim 24 preferably has an outer annular portion for receiving a tire 26 and a spoke attachment portion coupled to a plurality of spokes.

Rim 24 is constructed of a substantially rigid material, such as those materials, which are well known in the art. For example, rims 24 can be constructed of any suitable metallic material, such as plated steel, stainless steel, aluminum, magnesium or titanium, as well as other non-metallic materials, such as a carbon fiber composite, which can be utilized for a bicycle wheel.

Annular spoke attachment portion 52 is located radially inward of outer annular portion 50, as seen in FIGS. 4–5 and 8–10. Rim 24 is a tubular member with a hollow, annular inner area. Spoke openings 58 are circumferentially spaced and formed in a pair of opposing side sections 54 of spoke attachment portion 52. Spoke openings 58 are sized for receiving spokes 22 with reinforcement members or washers 48 therein. Reinforcement members or washers 48 are designed to disperse the stresses applied to rim 24 by spokes 22.

The plurality of spoke openings 58 are preferably circular openings that are larger than the outer end portions 40 of the spokes 22 arranged therein. Spoke openings 58 are larger than conventional spoke openings. Therefore, reinforcement members or washers 48 distribute the forces on rim 24 over a greater area than ordinary round spokes such that stress fracturing and/or tearing of rim 24 is minimized. Preferably, openings 58 have circumferential widths or diameters of at least approximately 5.0 millimeters.

Figure 8:
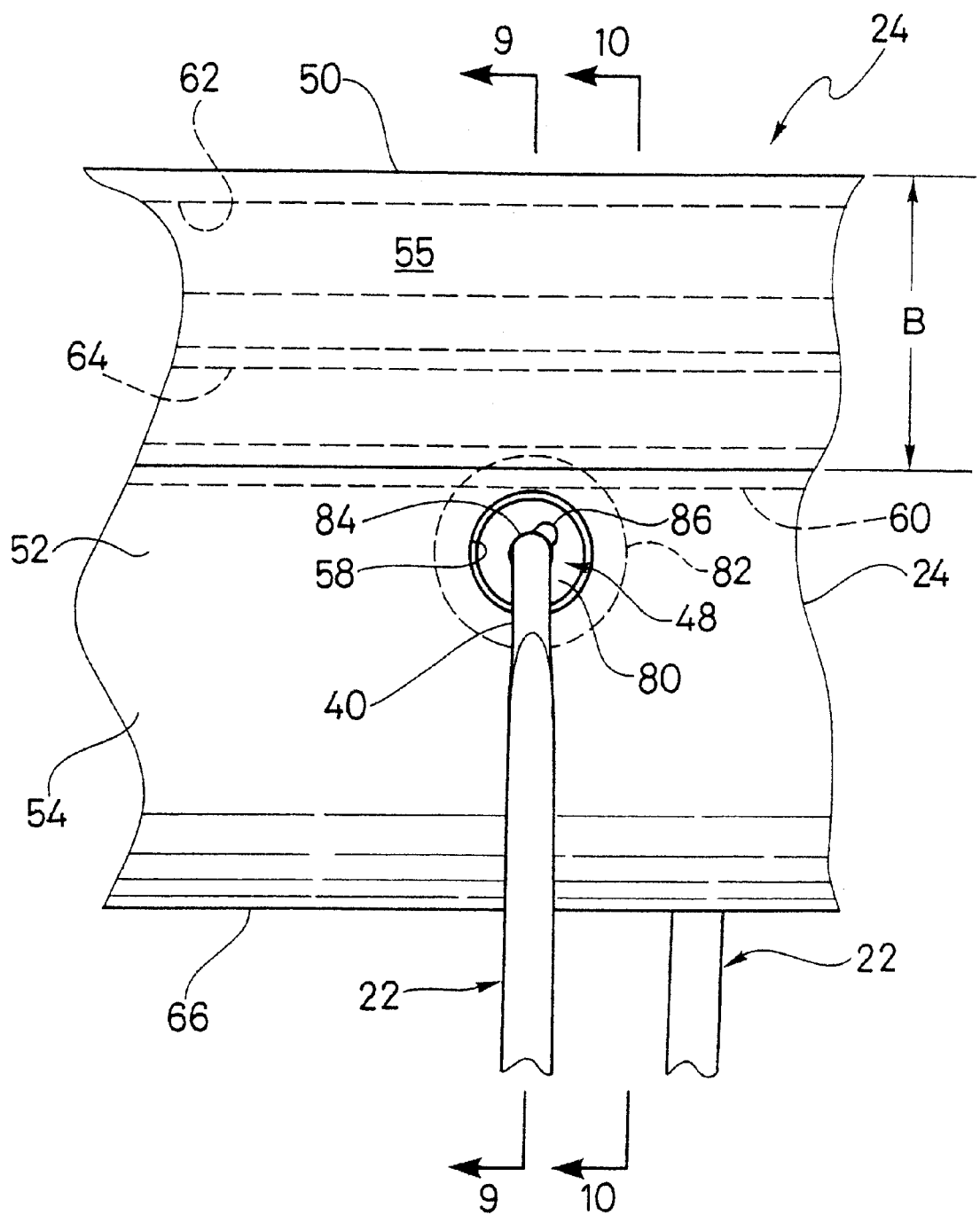
FIG. 8 is an enlarged, partial side elevational view of a portion of the front bicycle wheel illustrating the connection between the rim and two of the spokes of the bicycle wheel illustrated in FIG. 1.
Figure 9:
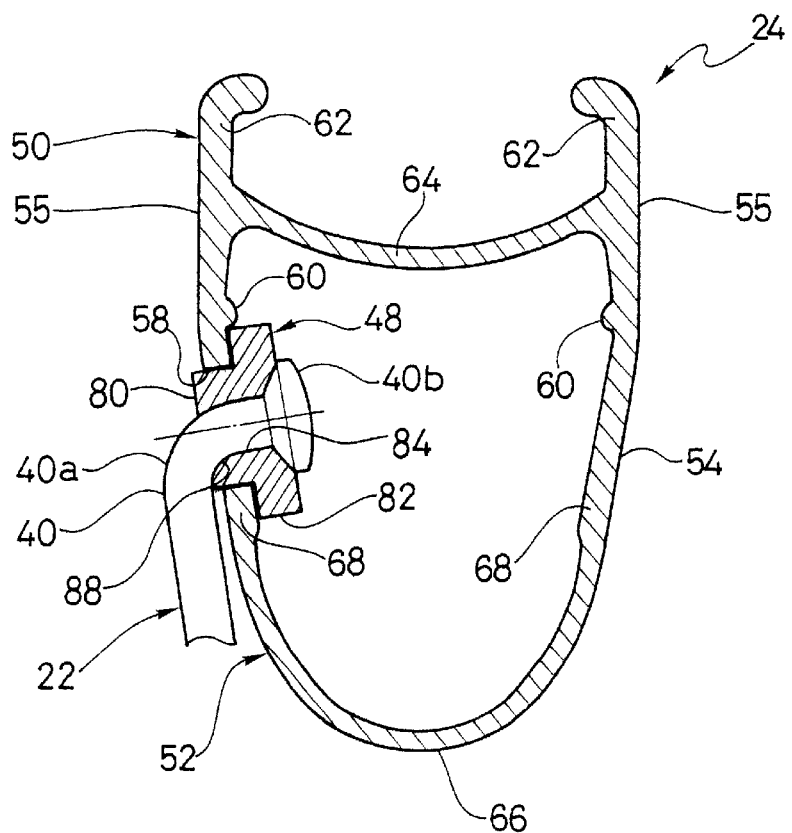
FIG. 9 is a partial, cross-sectional view of the bicycle rim as seen along section line 9—9 of FIG. 8 with one of the reinforcement members of the bicycle wheel illustrated in cross-section and one of the spokes illustrated in elevation.
Figure 10:
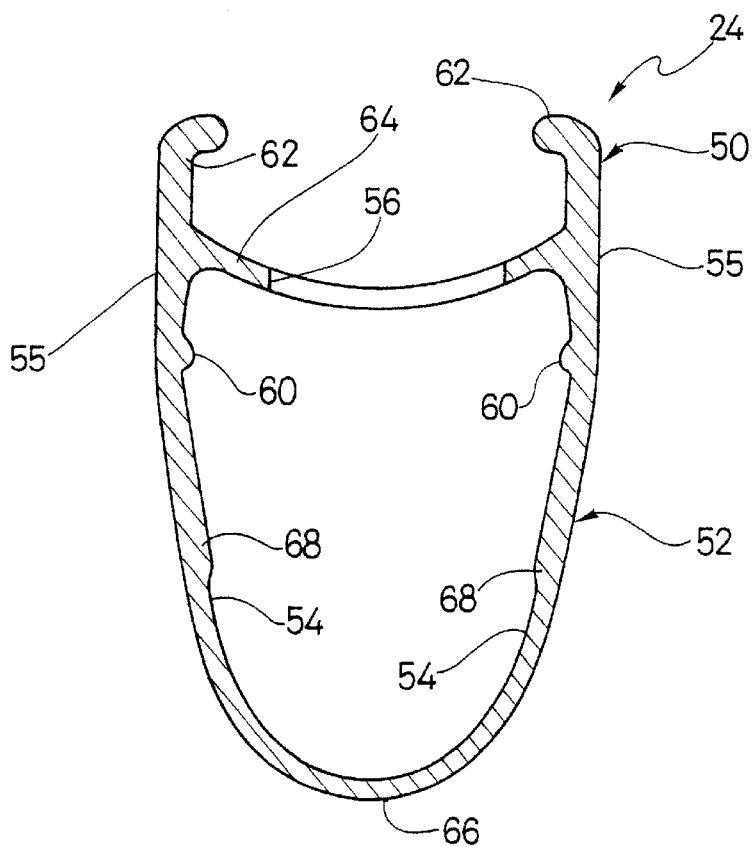
FIG. 10 is a partial, cross-sectional view of the bicycle rim as seen along section line 10—10 of FIG. 8 with the spokes and reinforcement member removed for the purposes of illustration.

Each spoke opening 58 is located adjacent one of the access apertures 56 so that a spoke 22 with a reinforcement member 48 can be inserted through access aperture 56 and into spoke opening 58 as best seen in FIGS. 8–10. Access apertures 56 are preferably circular openings with a width or diameter of approximately 9.0 millimeters or larger. In any event, the width or diameter of access apertures 56 should be at least the width or diameter of reinforcement members 48, e.g., at least approximately 8.0 millimeters.

Spoke attachment portion 52 is provided with a pair of reinforcing elements 60 located radially outwardly of the spoke openings 58. Reinforcing elements 60 are a pair of continuous ribs that are located on the interior surfaces of opposing sections 54. The tension in spokes 22 applies an outwardly directed force on the opposing sections 54 just radially outwardly of the spoke openings 58 and reinforcing elements 60 are located to strengthen the sides of rim 24.

Figure 5:
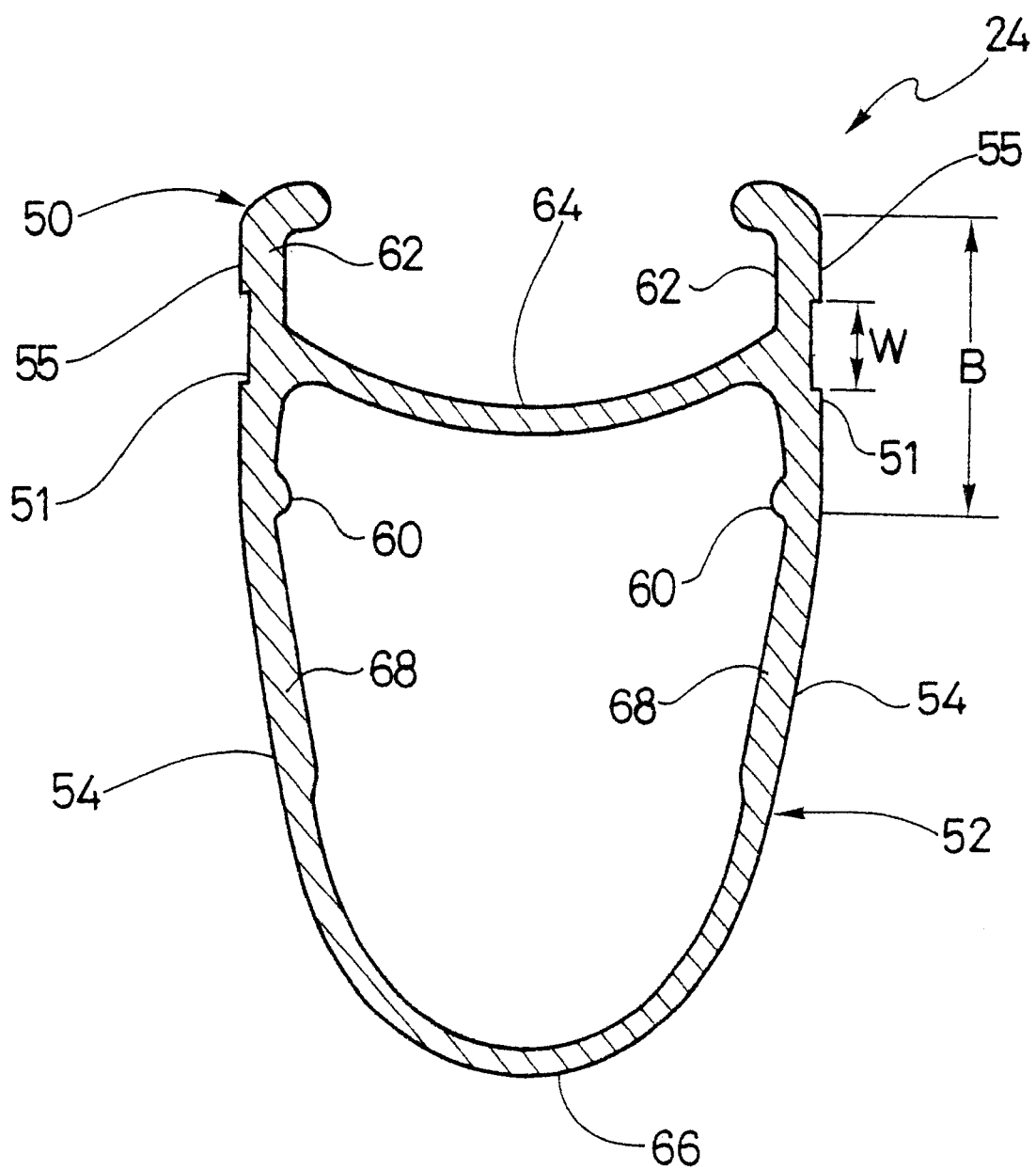
FIG. 5 is a partial, cross-sectional view of the bicycle rim as seen along section line 5—5 of FIG. 4 illustrating the wear indicator of the rim illustrated in FIG. 1.

As best seen in FIGS. 5, 9 and 10, outer annular portion 50 basically has a pair of outer circumferential flange sections 62 for retaining tire 26 and a connecting section 64. Connecting section 64 has access apertures 56 formed therein. Spoke attachment portion 52 basically includes opposing sections 54 coupled together at radially inner ends by a radially inner section 66. Opposing sections 54 each have a circumferential ring 68 with the spoke attachment openings 58 formed therein. Each circumferential ring 68 has an increased wall thickness.

Referring to FIGS. 8–9, reinforcement members or washers 48 will now be discussed in more detail. Reinforcement members or washers 48 are designed to disperse the stresses applied to rim 24 by spokes 22. Reinforcement members or washers 48 are preferably disk shaped members with each reinforcement member or washer 48 having a first (smaller) circular stepped portion 80, a second (larger) circular stepped portion 82 and a centrally located spoke hole 84. Preferably, reinforcement members or washers 48 are constructed as one-piece, unitary members.

An example of one suitable material for reinforcement members or washers 48 is aluminum alloy. Of course, other materials can be used. It will be readily apparent to those skilled in the art from this disclosure that reinforcement members or washers 48 do not have to be stepped as illustrated.

The diameters or widths of stepped portions 80 and 82 should be as large as reasonably possible to disperse the stresses on rim 24 from spokes 22. In other words, it is better for the diameters or widths of stepped portions 80 and 82 to be as large as reasonably possible. First circular stepped portion 80 of each of the reinforcement members or washers 48 can be frictionally retained within one of the spoke openings 58 of rim 24. Since spokes 22 are placed under tension between hub 20 and rim 24, spokes 22 apply an inward radial force at circumferentially spaced locations that correspond to spoke openings 58. Accordingly, the strength of rim 24 is increased without adding thickness of rim 24.

Spoke holes 84 of reinforcement washers 48 are designed so that spokes 22 can freely pass therethrough. The center portions 42 of spokes 22 are elliptical in cross-section. Accordingly, spoke holes 84 have longitudinally extending slots 86 that increase the effective diameter or width of spoke holes 84 to allow the center portions 42 of spokes 22 to pass therethrough. A slanted cutout or notch 88 is formed on the axial face of first step portion 80. This notch 88 accommodates the bent section 40a of the outer end portion of spoke 22.

In assembling bicycle wheel 12, reinforcement members 48 are first placed on the outer end portions 40 of spokes 22. Inner end portions 44 of spokes 22 are first inserted into spoke holes 84 of reinforcement members or washers 48. Once the center portions 42 of spokes 22 have passed through spoke holes 84 of reinforcement members or washers 48, the spokes 22 can be further rotated within spoke holes 84 such that the bent section 40a of the spokes 22 are seated in notches 88. The heads 40b of spokes 22 now engage the axial surface of second step portion 82 of reinforcement members or washers 48.

Now, the spokes 22 with reinforcement members or washers 48 thereon can be installed into rim 24. The spokes 22 with reinforcement members or washers 48 are inserted through the access apertures 56 in the outer surface of rim 24 at an angle such that the inner end portions 44 of spokes 22 pass through spoke openings 58. Once the spokes 22 and washers 48 have fully entered the interior of rim 24, the first stepped portions 80 of reinforcement washers 48 are seated in the spoke openings 58 of rim 24. Preferably, spoke openings 58 are slightly larger than the diameter or width of stepped portion 80 such that washers 48 are either loosely received within openings 58 or securely received via interference fit.

Now, the inner end portions 44 of spokes 22 are inserted into openings 34 of hub 20. Spoke nipples or nuts 46 are also inserted into openings 34 and threaded onto the inner end portions 44 of spokes 22. The tension in spokes 22 is then adjusted such that rim 24 is properly positioned about hub 20. The wheel 12 can now be installed on a frame of a bicycle in a conventional manner via hub 20.

The terms of degree such as "substantially", "about" and "approximately" as used herein mean a reasonable amount of deviation of the modified term such that the end result is not significantly changed. These terms should be construed as including a deviation of ±25% of the modified term if this would not negate the meaning of the word it modifies.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A bicycle rim with a wear indicator, comprising:

an outer annular portion adapted to receive a tire; and an annular spoke attachment portion coupled to said outer annular portion and adapted to be coupled to a plurality of spokes, said rim having a pair of oppositely facing subsantially smooth annular braking surfaces and a connecting section extending between said pair of oppositely facing braking surfaces to reinforce said rim, at least one of said substantially smooth annular braking surfaces having a wear indicator being located to overlap one end of said connecting section in a radial direction.

2. The bicycle rim according to claim 1, wherein said wear indicator is a recess formed in said at least one braking surface.

3. The bicycle rim according to claim 2, wherein said recess is formed of a cylindrical side wall and an end wall.

4. The bicycle rim according to claim 2, wherein said recess has a radial width smaller than a radial width of said at least one annular braking surface.

5. The bicycle rim according to claim 4, wherein said radial width of said recess is about 1.0 to about 5.0 millimeters.

6. The bicycle rim according to claim 5, wherein said radial width of said recess is about 3.0 millimeters.

7. The bicycle rim according to claim 2, wherein said recess has a depth corresponding to a predetermined amount of wear of said at least one annular braking surface.

8. The bicycle rim according to claim 7, wherein said depth of said recess is about 0.10 to about 0.30 millimeter.

9. The bicycle rim according to claim 8, wherein said depth of said recess is about 0.20 millimeter.

10. The bicycle rim according to claim 2, wherein said recess is formed of a side wall substantially perpendicular to said at least one annular braking surface and an end wall offset from said at least one annular braking surface.

11. The bicycle rim according to claim 2, wherein said at least one annular braking surface having an inner edge and an outer edge with said recess formed at a radially centered position in said at least one annular braking surface relative to said inner and outer edges of said at least one annular braking surface.

12. The bicycle rim according to claim 1, wherein each of said annular braking surfaces has a single wear indicator extending circumferentially along only a portion of said annular braking surface. annular breaking surfaces.

13. The bicycle rim according to claim 12, wherein each of said wear indicators is a recess formed in each of said annular braking surfaces.

14. The bicycle rim according to claim 13, wherein each of said recesses is formed of a cylindrical side wall and an end wall.

15. The bicycle rim according to claim 13, wherein each of said recesses has a radial width smaller than a radial width of each of said annular braking surfaces.

16. The bicycle rim according to claim 15, wherein each of said recesses has a radial width of about 1.0 to about 5.0 millimeters.

17. The bicycle rim according to claim 16, wherein each of said recesses has a radial width of about 3.0 millimeters.

18. The bicycle rim according to claim 13, wherein each of said recesses has a depth corresponding to a predetermined amount of wear of each of said annular braking surfaces.

19. The bicycle rim according to claim 18, wherein each of said recesses has a depth of about 0.10 to about 0.30 millimeter.

20. The bicycle rim according to claim 19, wherein each of said recesses has a depth of about 0.20 millimeter.

21. The bicycle rim according to claim 13, wherein each of said recesses is formed of a side wall substantially perpendicular to each of said annular braking surfaces and an end wall offset from each of said annular braking surfaces.

22. The bicycle rim according to claim 13, wherein each of said annular braking surfaces having an inner edge and an outer edge with each of said recesses formed at a radially centered position in each of said annular braking surfaces relative to said inner and outer edges of each of said annular breaking surfaces.

23. The bicycle rim according to claim 12, wherein each of said annular braking surfaces having an inner edge and an outer edge with each of said recesses formed at a radially centered position in each of said annular braking surfaces relative to said inner and outer edges of each of said annular breaking surfaces.

24. The bicycle rim according to claim 1, further comprising a plurality of inwardly extending spokes, each spoke having an inner end and an outer end coupled to said spoke attachment portion.

25. The bicycle rim according to claim 24, further comprising
   a hub coupled to said inner ends of said inwardly extending spokes.

26. The bicycle rim according to claim 1, wherein
   said at least one annular braking surface having an inner edge and an outer edge with said wear indicator arranged at a radially centered position of said at least one annular braking surface relative to said inner and outer edges of said at least one annular braking surface.

27. The bicycle rim according to claim 2, wherein
   said recess has material arranged therein.

28. The bicycle rim according to claim 2, wherein
   said recess has a side wall and an end wall, with a curved intersection therebetween.

29. The bicycle rim according to claim 12, wherein
   said wear indicators are circumferentially aligned with each other.

* * * * *